(12) United States Patent
Han

(10) Patent No.: US 8,259,240 B2
(45) Date of Patent: Sep. 4, 2012

(54) MULTI-TOUCH SENSING THROUGH FRUSTRATED TOTAL INTERNAL REFLECTION

(75) Inventor: Jefferson Y. Han, Holliswood, NY (US)

(73) Assignee: Perceptive Pixel Inc., New York, NY (US)

( * ) Notice: Subject to any disclaimer, the term of this patent is extended or adjusted under 35 U.S.C. 154(b) by 0 days.

(21) Appl. No.: 13/430,484

(22) Filed: Mar. 26, 2012

(65) Prior Publication Data
US 2012/0182266 A1 Jul. 19, 2012

Related U.S. Application Data

(63) Continuation of application No. 12/185,782, filed on Aug. 4, 2008, now Pat. No. 8,144,271, and a continuation-in-part of application No. 11/833,908, filed on Aug. 3, 2007.

(60) Provisional application No. 60/953,966, filed on Aug. 3, 2007, provisional application No. 60/821,325, filed on Aug. 3, 2006.

(51) Int. Cl.
*G02F 1/1335* (2006.01)
*G02B 6/00* (2006.01)
*G06F 3/042* (2006.01)

(52) U.S. Cl. ............... 349/12; 349/23; 349/60; 349/64; 349/112; 385/12; 385/13; 385/901; 345/175

(58) Field of Classification Search .............. 349/12, 349/23, 60, 64, 112, 138, 158; 385/12, 13, 385/901; 250/221; 313/504; 345/175
See application file for complete search history.

(56) References Cited

U.S. PATENT DOCUMENTS

| | | |
|---|---|---|
| 3,200,701 A | 8/1965 | White |
| 3,673,327 A | 6/1972 | Johnson et al. |
| 3,846,826 A | 11/1974 | Mueller |
| 4,134,063 A | 1/1979 | Nicol et al. |
| 4,346,376 A | 8/1982 | Mallos |
| 4,484,179 A | 11/1984 | Kasday |

(Continued)

FOREIGN PATENT DOCUMENTS
DE 100 47 920 A1 4/2002
(Continued)

OTHER PUBLICATIONS

Anonymous: "Anti-reflective coating" Wikipedia Feb. 6, 2009 retrieved from the Internet: http://replay.waybackmachine.org/20090206235736//http://en.widipedia.org/wiki/Anti-reflective_coating (retrieved on Mar. 30, 2011).

(Continued)

*Primary Examiner* — Brian Healy
(74) *Attorney, Agent, or Firm* — Fish & Richardson P.C.

(57) ABSTRACT

High-resolution, scalable multi-touch sensing display systems and processes based on frustrated total internal reflection employ an optical waveguide that receives light, such as infrared light, that undergoes total internal reflection and an imaging sensor that detects light that escapes the optical waveguide caused by frustration of the total internal reflection due to contact by a user. The optical waveguide when fitted with a compliant surface overlay provides superior sensing performance, as well as other benefits and features. The systems and processes described provide true multi-touch (multi-input) and high-spatial and temporal resolution capability due to the continuous imaging of the frustrated total internal reflection that escapes the entire optical waveguide. Among other features and benefits, the systems and processes are scalable to large installations.

20 Claims, 10 Drawing Sheets

U.S. PATENT DOCUMENTS

| | | | |
|---|---|---|---|
| 4,816,811 A | 3/1989 | Bogatin et al. | |
| 5,942,761 A | 8/1999 | Tuli | |
| 5,973,844 A | 10/1999 | Burger | |
| 6,061,177 A | 5/2000 | Fujimoto | |
| 6,323,846 B1 | 11/2001 | Westerman | |
| 6,323,892 B1 | 11/2001 | Mihara | |
| 6,700,129 B1 | 3/2004 | Usuda et al. | |
| 6,883,919 B2 | 4/2005 | Travis | |
| 6,895,164 B2 | 5/2005 | Saccomanno | |
| 6,972,753 B1 | 12/2005 | Kumura et al. | |
| 6,997,558 B2 | 2/2006 | Perlin et al. | |
| 7,030,861 B1 | 4/2006 | Westerman et al. | |
| 7,302,152 B2 | 11/2007 | Luther et al. | |
| 7,330,629 B2 | 2/2008 | Cooke et al. | |
| 7,351,949 B2 | 4/2008 | Oon et al. | |
| 7,394,058 B2 | 7/2008 | Chua et al. | |
| 7,410,286 B2 | 8/2008 | Travis | |
| 7,412,119 B2 | 8/2008 | Smits | |
| 7,417,627 B2* | 8/2008 | Cok | 345/173 |
| 8,144,271 B2* | 3/2012 | Han | 349/12 |
| 2003/0210537 A1 | 11/2003 | Engelmann | |
| 2004/0071417 A1 | 4/2004 | Veligdan | |
| 2004/0201579 A1 | 10/2004 | Graham | |
| 2005/0012722 A1 | 1/2005 | Chon | |
| 2005/0068537 A1 | 3/2005 | Han et al. | |
| 2005/0162381 A1 | 7/2005 | Bell et al. | |
| 2005/0200293 A1 | 9/2005 | Naugler et al. | |
| 2006/0022956 A1 | 2/2006 | Lengeling et al. | |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0033724 A1 | 2/2006 | Chaudhri et al. | |
| 2006/0053387 A1 | 3/2006 | Ording | |
| 2006/0085757 A1 | 4/2006 | Andre et al. | |
| 2006/0086896 A1 | 4/2006 | Han | |
| 2006/0098004 A1* | 5/2006 | Cok | 345/207 |
| 2006/0158437 A1 | 7/2006 | Blythe et al. | |
| 2006/0188196 A1 | 8/2006 | Charters et al. | |
| 2006/0227120 A1 | 10/2006 | Eikman | |
| 2006/0279558 A1 | 12/2006 | Van Delden et al. | |
| 2007/0070050 A1 | 3/2007 | Westerman et al. | |
| 2007/0084989 A1 | 4/2007 | Lange et al. | |
| 2007/0152985 A1 | 7/2007 | Ostergaard et al. | |
| 2008/0029691 A1 | 2/2008 | Han | |
| 2008/0150913 A1 | 6/2008 | Bell et al. | |
| 2008/0179507 A2 | 7/2008 | Han | |
| 2008/0192025 A1 | 8/2008 | Jaeger et al. | |
| 2008/0284925 A1 | 11/2008 | Han | |
| 2009/0033637 A1 | 2/2009 | Han | |
| 2009/0128499 A1 | 5/2009 | Izadi et al. | |
| 2010/0149134 A1 | 6/2010 | Westerman et al. | |
| 2010/0302185 A1 | 12/2010 | Han et al. | |
| 2010/0302196 A1 | 12/2010 | Han et al. | |
| 2010/0302210 A1 | 12/2010 | Han et al. | |

FOREIGN PATENT DOCUMENTS

| | | |
|---|---|---|
| JP | 62-107325 A | 5/1987 |
| JP | 8-050526 A | 2/1996 |
| JP | 10-162698 A | 6/1998 |
| JP | 2004-94569 | 3/2004 |
| JP | 2006-318512 | 11/2006 |
| WO | WO01/72037 | 9/2001 |
| WO | WO02/45413 A1 | 6/2002 |
| WO | WO2005/029172 | 3/2005 |
| WO | WO2005/029395 A2 | 3/2005 |
| WO | WO2006/044652 A1 | 4/2006 |
| WO | WO2006/082444 A2 | 8/2006 |
| WO | WO2007/003196 A2 | 1/2007 |
| WO | WO2007008766 A1 | 1/2007 |
| WO | WO2008/017077 | 2/2008 |
| WO | WO2009/018317 | 2/2009 |
| WO | WO2009/020940 | 2/2009 |
| WO | WO2010/141372 | 12/2010 |
| WO | WO2010/141380 | 12/2010 |
| WO | WO2010/141453 | 12/2010 |

OTHER PUBLICATIONS

Boual Sophie; Large Timothy; Buckingham Mark; Travis Adrian; Munford Simon "Wedge Displays as Cameras" 2006 Society for Information Display (SID) International Symposium Digest of technical Papers pp. 1999-2002 (2006).

Buxton W. Hill R. and Rowley P. "Issues and Techniques in Touch-Sensitive Tablet Input" Proceedings of the 12th Annual Conference on Computer Graphics and Interactive Techniques SIGGRAPH '85. ACM Press New York NY 215-224 (1985).

Han Jefferson Y. "Low-Cost Multi-Touch Sensing Through Frustrated Total Internal Reflection" Media Research Laboratory (New York University; Oct. 23-27, 2005; Seattle Washington) 115-118.

Lee S. Buxton W. and Smith K.C. "A Multi-Touch Three Dimensional Touch-Sensitive Tablet" Proceedings of the SIGCHI Conference on Human Factors in Computing Systems (San Francisco CA USA) CHI '85. ACM Press New York NY 21-25 (1955).

Malik S and Laszio J. "Visual Touchpad: A Two-Handed Gestural Input Device" Proceedings of the 6th International Conference on Multimodal Interfaces (State College PA USA Oct. 13-15, 2004) ICMI '04. ACM Press New York NY 289-296 (2004) 8 pgs.

Matsushita N. and Rekimoto J. "HoloWall: Designing a Finger Hand Body and Object Sensitive Wall" Proceedings of the 10th Annual ACM Symposium on User Interface Software and Technology (Banff Alberta Canada Oct. 14-17, 1997) UIST '97. ACM Press New York NY 209-210 (1997).

Rekimoto J. "SmartSkin: An Infrastructure for Freehand Manipulation on Interactive Surfaces" Proceedings of the SIGCHI Conference on Human Factors in Computing Systems CHI '02. ACM Press New York NY 113-120 (2002) 8 pgs.

Taira Y. et al. "Low-Power LCD Using a Novel Optical System" 2002 SID International Symposium Digest of Technical Papers Boston MA May 21-23, 2002.

Westerman W. Elias J.G. and Hedge A. "Multi-Touch: A New Tactile 2-D Gesture Interface for Human-Computer Interaction" Proceedings of the Human Factors and Ergonomics Society 45th Annual Meeting (Minneapolis/St. Paul MN Oct. 2001) 632-636 (2001).

Wilson A.D. "TouchLight: An Imaging Touch Screen and Display for Gesture-Based Interaction" Proceedings of the 6th International Conference on Multimodal Interfaces (State College PA USA Oct. 13-15, 2004) ICMI '04. ACM Press New York NY (2004) 6 pgs.

Non-final Office Action issued in U.S. Appl. No. 11/833,908 mailed Sep. 13, 2010 49 pages.

Final Office Action issued Jan. 19, 2012 in U.S. Appl. No. 11/833,908 43 pages.

Non-final Office Action issued in U.S. Appl. No. 12/185,782 mailed Jan. 12, 2011 14 pages.

Notice of Allowance issued Nov. 18, 2011 in U.S. Appl. No. 12/185,782, 8 pages.

International Search Report dated Oct. 20, 2008 from WO08/017077, 3 pages.

International Search Report dated Feb. 19, 2009 from WO09/020940, 2 pages.

International Search Report dated Jan. 29, 2009 from WO09/018317, 2 pages.

International Search Report and Written Opinion dated Apr. 28, 2011 from WO10/141372, 25 pages.

International Search Report and Written Opinion dated Mar. 1, 2011 from WO10/141308, 18 pages.

International Search Report and Written Opinion dated Apr. 28, 2011 from WO10/141453, 18 pages.

Non-final Office Action issued in U.S. Appl. No. 11/833,908 mailed Jun. 9, 2011, 39 pages.

European Search Report dated Oct. 7, 2011 from EP 08782614.5, 5 pages.

* cited by examiner

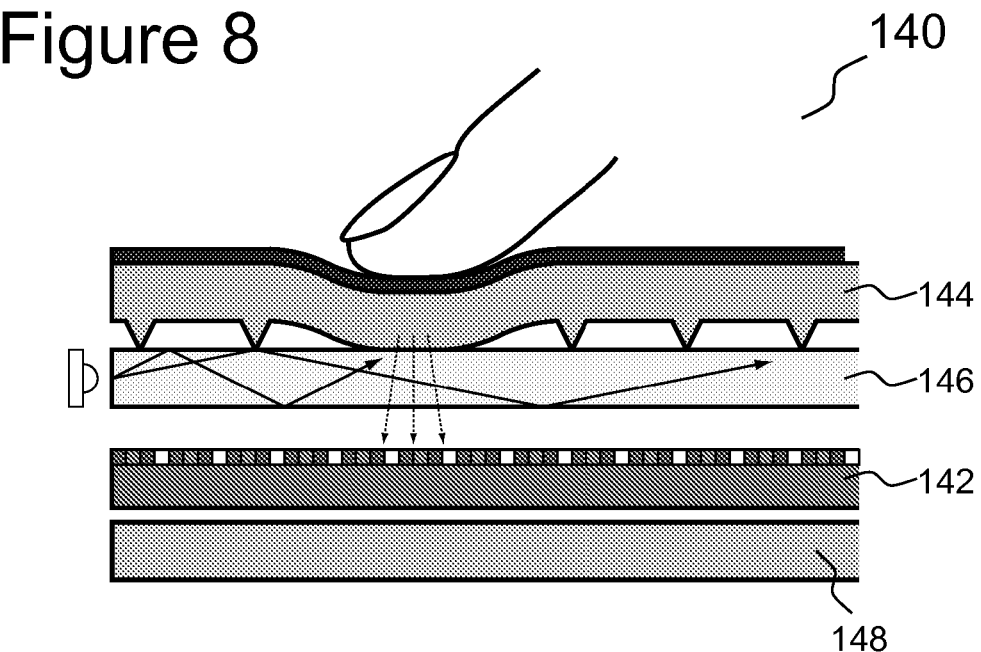
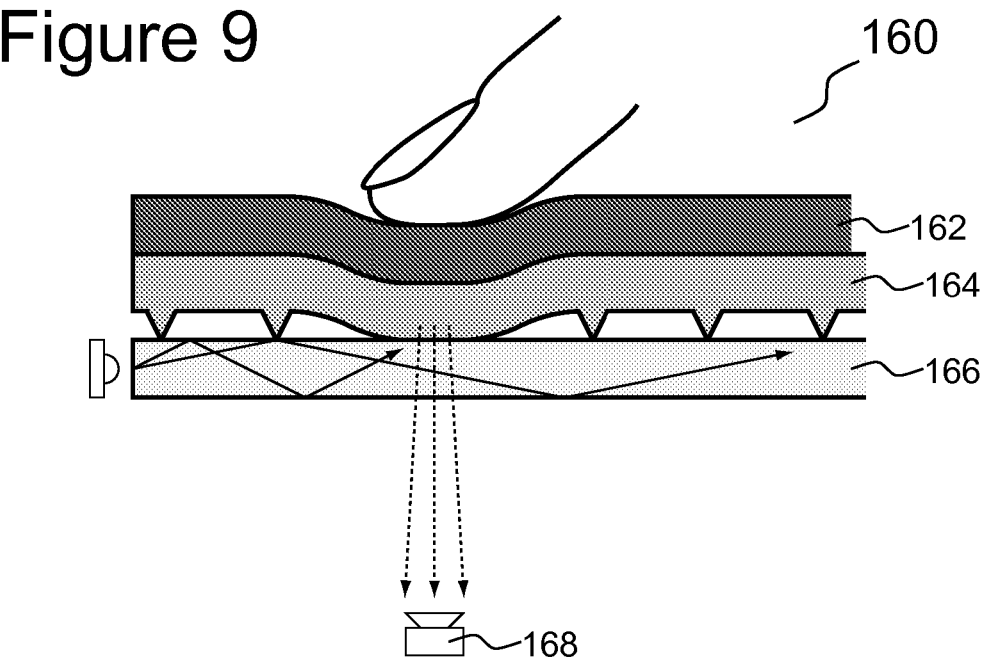

MULTI-TOUCH SENSING THROUGH FRUSTRATED TOTAL INTERNAL REFLECTION

CROSS REFERENCE TO RELATED APPLICATIONS

This application is a continuation of U.S. patent application Ser. No. 12/185,782, filed Aug. 4, 2008, now U.S. Pat. No. 8,144,271, and claims priority to U.S. provisional patent application No. 60/953,966, filed Aug. 3, 2007. This application also is a continuation-in-part of U.S. patent application Ser. No. 11/833,908, filed Aug. 3, 2007, now pending, which claims priority to U.S. provisional patent application No. 60/821,325, filed Aug. 3, 2006. The disclosures of U.S. patent application Ser. Nos. 12/185,782, 60/953,966, 11/833,908 and 60/821,325 are incorporated herein by reference in their entireties.

BACKGROUND OF THE INVENTION

1. Field of the Invention

The present invention relates to techniques for enabling high-resolution multi-touch sensing based on frustrated total internal reflection.

2. Description of the Related Art

Touch sensing is commonplace for single points of contact. One group of touch sensing techniques is to employ frustrated total internal reflection (FTIR). When light encounters an interface to a medium with a lower index of refraction (e.g. glass to air), the light becomes refracted to an extent that depends on its angle of incidence, and beyond a certain critical angle, it undergoes total internal reflection (TIR). Fiber optics, light pipes, and other optical waveguides rely on this phenomenon to transport light efficiently with very little loss. However, another material at the interface can frustrate this total internal reflection, causing light to escape the waveguide there instead.

Frustrated total internal reflection is well known and has been used in the biometrics community to image fingerprint ridges since at least the 1960s. U.S. Pat. No. 3,200,701 to White, incorporated herein by reference, issued in 1965 and describes using FTIR to optically detect the ridge pattern of a skin surface.

U.S. Pat. No. 3,673,327 to Johnson et al., incorporated herein by reference, issued in 1972 and discloses an early version of a touch actuable device in which a binary device detects the attenuation of light through a platen waveguide caused by a finger in contact.

U.S. Pat. No. 3,846,826 to Mueller, incorporated herein by reference, issued in 1974 and describes an imaging touch sensor that allows a user to "paint" onto a separate display using free-form objects, such as brushes, styli and fingers. In that device, light from the flying spot of a CRT is totally internally reflected off the face of a large prism and focused onto a single photo detector, thereby generating an updating bitmap of areas that are being contacted. In 1985, this method was updated in an optically inverted configuration, with a video camera and a broad light source replacing the CRT and photodetector, as disclosed in Greene, R., "The Drawing Prism: A Versatile Graphic Input Device," Proceedings of the 12th Annual Conference on Computer Graphics and Interactive Techniques SIGGRAPH '85, ACM Press, New York, N.Y., 103-110 (1985), incorporated herein by reference.

U.S. Pat. No. 4,346,376 to Mallos, incorporated herein by reference, discloses a CRT-based touch sensor, which replaced the bulky prism with a thin platen waveguide and operates by detecting the light scattered away by an object in optical contact. More recent fingerprint sensors use this approach, as disclosed in Fujieda, I., Haga, H., "Fingerprint Input based on Scattered-Light Detection," Applied Optics-IP, 36, 35, 9152-9156 (1997), incorporated herein by reference.

The robotics community also has used this approach since 1984 in the construction of tactile sensors for robot grippers, but with a compliant surface overlay. Various publications include: Mott, D. H., Lee, M. H., and Nicholls, H., "An Experimental Very High Resolution Tactile Sensor Array," Robot Sensors Vol. 2: Tactile and Non-Vision, Pugh, A., Ed. Springer-Verlag, Berlin, 179-188 (1986); Tanie, K., Komoriya, K., Kaneko, M., Tachis, S., and Fujikava, A., "A High Resolution Tactile Sensor," Robot Sensors Vol. 2: Tactile and Non-Vision, Pugh, A., Ed. Springer-Verlag, Berlin, 189-198 (1986); and U.S. Pat. No. 4,668,861 to White, each of which is incorporated herein by reference.

With the use of a compliant surface overlay, a structured flexible membrane, normally kept apart from the waveguide by an air-gap, makes optical contact with the waveguide when depressed. U.S. Pat. No. 4,484,179 to Kasday, incorporated herein by reference, discloses this approach in the context of a touch sensitive display.

One fairly straightforward approach for sensing multiple points of contact simultaneously or "multi-touch sensing" employing non-FTIR based methods is to utilize multiple sensors, with each sensor sensing a respective point of contact. For example, Tactex Control Inc. has a line of array sensors for use as floor sensors, security devices and other applications. As another example, the publication Lee, S., Buxton, W., and Smith, K. C., "A Multi-Touch Three Dimensional Touch-Sensitive Tablet," Proceedings of the SIGCHI Conference on Human Factors in Computing Systems (San Francisco, Calif., United States), CHI '85. ACM Press, New York, N.Y., 21-25 (1985), incorporated herein by reference, describes the use of sensors arranged in a matrix configuration with an active element (e.g. diode, transistor) disposed at each node.

Multi-touch sensing may be achieved by employing a passive matrix of sensing elements, such as force-sensitive-resistors (FSRs), as discussed in Hillis, W. D., "A High Resolution Imaging Touch Sensor," International Journal of Robotics Research, pages 1, 2, 33-44 (1982), incorporated herein by reference. U.S. Pat. No. 4,134,063 to Nicol et al., incorporated herein by reference, discloses the use of capacitive electrodes for this purpose. And more recently discussed in Rekimoto, J., "SmartSkin. An Infrastructure for Freehand Manipulation on Interactive Surfaces," Proceedings of the SIGCHI Conference on Human Factors in Computing Systems, CHI '02, ACM Press, New York, N.Y., 113-120 (2002), incorporated herein by reference. The Fingerworks iGesturePad is another example of a device that employs a passive matrix of capacitance sensors. U.S. Pat. No. 6,323,846 to Westerman et al., incorporated herein by reference, discloses additional examples of using such an array in a multi-touch surface system. Such systems, while less complex than systems that employ multiple active sensors, still entail numerous electrical connections and thus disadvantageously limit their application to uses that require relatively low resolution (e.g., under 100.times.100). Furthermore, such systems are visually opaque and thus require the use of top-projection if to be integrated with a graphic display.

The use of video cameras has been proposed to acquire high-resolution datasets at rapid rates. However, these machine vision based techniques are quite imprecise and are not able to determine if true touch contact has been made, a disparity that can be quite disturbing to the user. Recent approaches include estimating depth from intensity as discussed in Matsushita, N. and Rekimoto, J., "HoloWall: Designing a Finger, Hand, Body, and Object Sensitive Wall," Proceedings of the 10th Annual ACM Symposium on User Interface Software and Technology (Banff, Alberta, Canada, Oct. 14-17, 1997), UIST '97, ACM Press, New York, N.Y., 209-210 (1997); estimating depth from stereo as disclosed in Wilson, A. D., "TouchLight: An Imaging Touch Screen and Display for Gesture-Based Interaction," Proceedings of the 6th International Conference on Multimodal Interfaces (State College, Pa., USA, Oct. 13-15, 2004), ICMI '04, ACM Press, New York, N.Y., 69-76 (2004); Malik, S. and Laszlo, J., "Visual Touchpad: A Two-Handed Gestural Input Device," Proceedings of the 6th International Conference on Multimodal Interfaces (State College, Pa., USA, Oct. 13-15, 2004), ICMI '04, ACM Press, New York, N.Y., 289-296 (2004); and tracking markers embedded within a deformable substrate as disclosed in Kamiyama, K., Vlack, K., Mizota, T., Kajimoto, H., Kawakami, N., and Tachi, S., "Vision-Based Sensor for Real-Time Measuring of Surface Traction Fields," IEEE Comput. Graph. Appl. 25, 1 (January 2005), 68-75. Each of these references is incorporated herein by reference.

Additional publications that set forth various interaction techniques include: Buxton, W., Hill, R., and Rowley, P., "Issues and Techniques in Touch-Sensitive Tablet Input," Proceedings of the 12th Annual Conference on Computer Graphics and Interactive Techniques SIGGRAPH '85, ACM Press, New York, N.Y., 215-224 (1985); Dietz, P. and Leigh, D., "DiamondTouch: A Multi-User Touch Technology," Proceedings of the 14th Annual ACM Symposium on User Interface Software and Technology (Orlando, Fla., Nov. 11-14, 2001), UIST '01. ACM Press, New York, N.Y., 219-226 (2001); Westerman, W., Elias, J. G., and Hedge, A., "Multi-Touch: A New Tactile 2-D Gesture Interface for Human-Computer Interaction," Proceedings of the Human Factors and Ergonomics Society 45th Annual Meeting (Minneapolis/St. Paul, Minn., October 2001), 632-636 (2001); and Wu, M. and Balakrishnan, R., "Multi-Finger and Whole Hand Gestural Interaction Techniques for Multi-User Tabletop Displays," Proceedings of the 16th Annual ACM Symposium on User Interface Software and Technology (Vancouver, Canada, Nov. 2-05, 2003), UIST '03, ACM Press, New York, N.Y., 193-202 (2003), each of which is incorporated herein by reference.

OBJECTS AND SUMMARY OF THE INVENTION

In view of the foregoing, it is seen that there has been only limited development in the field of multi-touch sensing. Hence, there remains the need for multi-touch sensors that are relatively simple, inexpensive and scalable.

It is therefore an object of the present invention to provide multi-touch sensing systems/processes that are relatively simple, inexpensive and scalable for providing high-resolution multi-touch sensing.

It is a further object of the present invention to provide multi-touch sensing systems/processes that are based on frustrated total internal reflection.

In accordance with the present invention, a multi-touch sensing system comprises an optical waveguide having an index of refraction sufficient to cause light of at least one wavelength (e.g., narrow band wavelength) received in a predetermined direction to undergo total internal reflection within the optical waveguide. The system includes a compliant layer having a first surface disposed adjacent to and spaced from a first side of the optical waveguide, and the compliant layer is sufficiently deformable upon depression to allow portions of the first surface of the compliant layer to contact the optical waveguide. The first surface of the compliant layer has an index of refraction sufficiently similar to the index of refraction of the optical waveguide to cause, upon the first surface of the compliant layer contacting the optical waveguide, some of the light undergoing total internal reflection to scatter and to escape the optical waveguide. An image sensor detects some of the light that escapes from the optical waveguide.

In accordance with another embodiment of the present invention, a multi-touch sensing system comprises an optical waveguide, and a compliant layer directly coupled to the first side of the optical waveguide, where the compliant layer and the optical waveguide having substantially similar indexes of refraction so that light of at least one wavelength received by the optical waveguide in a predetermined direction undergoes total internal reflection within the optical waveguide and the compliant layer. The system also includes a cladding layer directly coupled to the compliant layer. The cladding layer has an index of refraction sufficiently lower than the index of refraction of the compliant layer so that deformation of the cladding layer causes some of the light undergoing total internal reflection to scatter and to escape the compliant layer and the optical waveguide. An image sensor detects some of the light that escapes the compliant layer and the optical waveguide.

In accordance with a further embodiment of the present invention, a multi-touch sensing system comprises a compliant optical waveguide having an index of refraction sufficient to cause light of at least one wavelength received in a predetermined direction to undergo total internal reflection within the compliant optical waveguide. The system also includes a cladding layer directly coupled to the first side of the compliant optical waveguide. The cladding layer has an index of refraction sufficiently lower than the index of refraction of the compliant optical waveguide so that deformation of the cladding layer causes some of the light undergoing total internal reflection to scatter and to escape the compliant optical waveguide. An image sensor detects some of the light that escapes the compliant optical waveguide.

For each of these embodiments, the present invention includes a number of aspects, features and variations. Some of these aspect and features are summarized below.

As one aspect of the present invention, the compliant layer has an associated light filter for filtering light of said at least one wavelength.

As a further aspect of the present invention, the compliant layer is deformable by depressing a second surface of the compliant layer by a finger of the user of the multi-touch sensing system.

As another aspect of the present invention, the image sensor is optically disposed to receive the light that escapes from the second side of the optical waveguide.

As a feature of this aspect, a band pass filter optically disposed between the second side of the optical waveguide and the image sensor allows substantially only the light at said wavelength to pass from the optical waveguide to the image sensor.

As a further aspect of the present invention, the image sensor is a flat image sensor such as a TFT (thin-film transistor) image sensor.

As an additional aspect of the present invention, the flat image sensor is a wedge-optic camera.

As another aspect of the present invention, the system includes a light source disposed directly against an edge of the optical waveguide for emitting the light that is received by the optical waveguide.

As a further aspect of the present invention, the optical waveguide may be a compound component. As a particular feature of this aspect, the optical waveguide is comprised of a non-compliant optical waveguide treated with a compliant layer.

As an additional aspect of the present invention, the system includes a rear projector for projecting a video image towards the second side of the optical waveguide. The compliant layer and the optical waveguide are substantially transparent to visible light so that the displayed video image is viewable through these layers.

As a feature of this aspect, a diffuser disposed on the compliant layer diffuses the projected video image.

As another feature of this aspect, the compliant layer itself is designed to diffuse the projected video image.

As yet a further aspect of the present invention, the system includes a film opaque to the light at said wavelength that is disposed on the compliant layer. A front projector projects a video image onto the film.

As yet another aspect of the present invention, the system includes a liquid crystal display (LCD) panel disposed on the second side of the optical waveguide for displaying a video image in a direction towards the compliant layer, and the compliant layer and the optical waveguide are substantially transparent to visible light so that the displayed video image is viewable through these layers.

As a feature of this aspect, multiple emissive sources provide backlight to the LCD panel and a backlight diffuser is disposed between the LCD panel and the emissive sources.

As a further feature of this aspect, a thin-profile wedge backlight unit provides backlight to the LCD panel.

As a feature of this feature, the image sensor is a wedge-optic camera.

As an additional feature of this aspect, multiple light sources are provided as backlight to the LCD panel, and a backlight diffuser is disposed between the LCD panel and the light sources, and the image sensor is a wedge-optic camera.

As another feature of this aspect, the LCD panel is disposed within an optical path of the light escaping from the optical waveguide to the image sensor, and the LCD panel is transparent to light at said wavelength so as to not prevent the light escaping the optical waveguide from reaching the image sensor.

As yet a further aspect of the present invention, the system includes a liquid crystal display (LCD)/optical sensing panel disposed on the second side of the optical waveguide for displaying a video image in a direction towards the compliant layer, and the image sensor is the optical sensing elements of the LCD/optical sensing panel.

As yet another aspect of the present invention, the system includes an active matrix OLED with integrated sensors disposed on the second side of the optical waveguide for displaying a video image in a direction towards the compliant layer, the image sensor is the integrated sensors of the active matrix OLED with integrated sensors.

As a further aspect of the present invention, the system includes a flexible OLED (FOLED) coupled to the compliant layer for displaying a video image in a direction towards a user of the multi-touch sensing system. The FOLED is sufficiently flexible to deform the compliant layer, upon depression of the FOLED, so that the compliant layer contacts the optical waveguide.

As an additional aspect of the present invention, the system includes a double-sided FOLED disposed on the compliant layer and that has an emissive layer for displaying a video image in a direction towards a user of the multi-touch sensing system and a sensing layer for sensing some of the light that escapes from the optical waveguide in a direction towards the user. The double-sided FOLED is sufficiently flexible to deform the compliant layer, upon depression of the double-sided FOLED, so that the compliant layer contacts the optical waveguide. The image sensor corresponds to the sensing layer of the FOLED.

As another aspect of the present invention, the system includes a combination flexible LCD and a flexible backlight coupled to the compliant layer for displaying a video image in a direction towards a user of the multi-touch sensing system. The combination of the flexible LCD and the flexible backlight are sufficiently flexible to deform the compliant layer, upon depression of the combination, so that the compliant layer contacts the optical waveguide.

As yet a further aspect of the present invention, the system includes a flexible LCD coupled to the compliant layer for displaying a video image in a direction towards a user of the multi-touch sensing system. A light source directs visible light through the compliant layer toward the flexible LCD, and the compliant layer diffuses the visible light.

As a feature of this aspect, the flexible LCD includes integrated sensors for sensing at least some of the light that escapes from the optical waveguide in a direction towards the user, and the image sensor corresponds to the sensors integrated in the flexible LCD.

As a further aspect of the present invention, light at said wavelength is infrared light and the image sensor detects infrared light. The system further includes a second image sensor for detecting visual information through the optical waveguide and the compliant layer. The second image sensor is equipped to not detect light escaping from the optical waveguide that is intended for the first sensor.

As a feature of this aspect, the second image sensor is capable of sensing an area beyond the compliant layer.

As yet another aspect of the present invention, the system incorporates an auto-calibration system. In particular, the auto-calibration system registers the infrared touch image coordinate system precisely to the graphical (displayed) coordinate system.

The present invention further includes various method embodiments. In accordance with a method embodiment of the present invention, a method of multi-touch sensing comprises totally internally reflecting at least some light of at least one wavelength within an optical waveguide, sufficiently depressing a compliant layer having a first surface disposed adjacent to and spaced from a first side of the optical waveguide to cause portions of the first surface of the compliant layer to contact the first side of the optical waveguide, the first surface of the compliant layer having an index of refraction sufficiently similar to an index of refraction of the optical waveguide to cause, upon the first surface of the compliant layer contacting the optical waveguide, some of the light undergoing total internal reflection to scatter and to escape the optical waveguide, and sensing at least some of the light escaping the optical waveguide.

In accordance with another method embodiment of the present invention, a method of multi-touch sensing comprises totally internally reflecting at least some light of at least one wavelength within an optical waveguide and a compliant layer that is directly coupled to a first side of the optical waveguide, deforming a cladding layer directly coupled to the compliant layer and having an index of refraction sufficiently lower than an index of refraction of the compliant layer to cause some of the light undergoing total internal reflection to scatter and to escape the compliant layer and the optical waveguide, and sensing at least some of the light escaping the optical waveguide and the compliant layer.

In accordance with a further method embodiment of the present invention, a method of multi-touch sensing comprises totally internally reflecting at least some light of at least one wavelength within a compliant optical waveguide, deforming a cladding layer directly coupled to the compliant optical waveguide and having an index of refraction sufficiently lower than an index of refraction of the compliant optical waveguide to cause some of the light undergoing total internal reflection to scatter and to escape the compliant optical waveguide, and sensing at least some of the light escaping the compliant optical waveguide.

For each of the foregoing summarized method embodiments, such embodiments include a number of aspects, features and variations. Those aspect and features summarized above in connection with the system embodiments also equally apply to the herein-described methods.

Additional objects, features, aspects, and advantages of the present invention are discussed below, and other objects, advantages and features will become readily apparent to those of ordinary skill in the art.

BRIEF DESCRIPTION OF THE DRAWINGS

The following detailed description, given by way of example and not intended to limit the present invention solely thereto, will best be appreciated in conjunction with the accompanying drawings, in which:

FIG. 8 schematically illustrates a multi-touch system that utilizes an active LCD panel that includes optical sensing elements;

FIG. 9 schematically illustrates a multi-touch system that employs a flexible OLED (FOLED);

DETAILED DESCRIPTION OF THE PRESENT INVENTION

Multi-touch sensing enables a user to interact with a system with more than one finger at a time, as in chording and bi-manual operations. Multi-touch sensing may accommodate multiple users simultaneously, which is especially useful for larger shared-display systems such as interactive walls and tabletops. FIGS. 1A through 1D of the drawings show several simple examples of multi-touch sensing of the present invention.

Multi-touch sensing in accordance with the present invention is based on frustrated total internal reflection (FTIR). FTIR sensing techniques can acquire true touch image information at high spatial and temporal resolutions, is scalable to large installations, and is well suited for use with many display technologies. When light encounters an interface to a medium with a lower index of refraction, such as glass to air, the light becomes refracted to an extent that depends on its angle of incidence. Beyond a certain critical angle, the light undergoes total internal reflection (TIR). But, if another material is placed at the interface, total internal reflection is frustrated, causing light to escape the waveguide. Since the concept of FTIR is well known and understood in the art, further technical description of FTIR is omitted herein except where necessary for an understanding of the present invention.

Various embodiments of the present invention and variations thereof are described hereinafter. For purposes herein, the terms "one embodiment," "another embodiment," "second embodiment," "third embodiment," "one variation," "another variation," and the like are used for convenience only to distinguish one structure, process, system, etc., from another structure, process, system, etc., and are not used to designate relative importance or amount of difference or other sort of quantification or comparative trait, unless otherwise expressly stated herein. Further, the terms "first", "second", "primary," "secondary" and the like are used to distinguish one component, element, object, step, process, activity or thing from another, and are not used to designate relative position or arrangement in time, unless otherwise expressly stated herein.

Non-Diffusive, Micro-Structured Index-Matched Compliant Layer for an FTIR Touch Sensor (Compliant Layer Design Type 1)

Figure 1A:
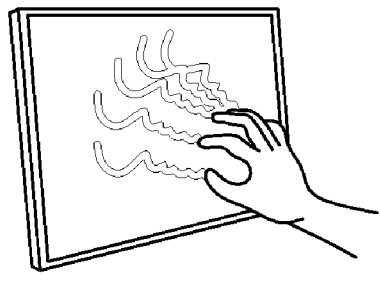
FIGS. 1A-1D show several examples of multi-touch sensing in accordance with the present invention.
Figure 1B:
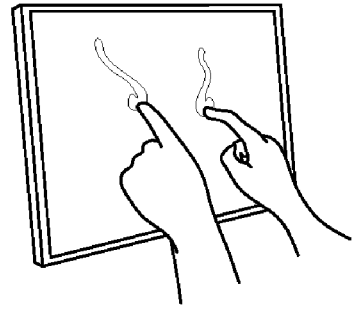
Figure 1C:
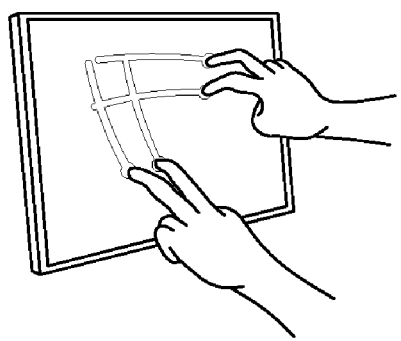
Figure 1D:
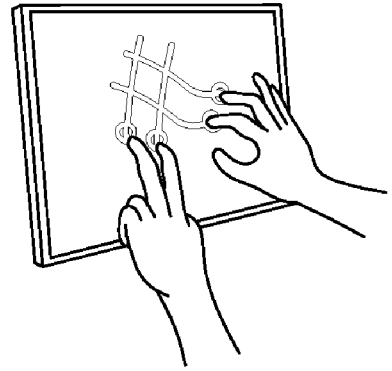
Figure 2:
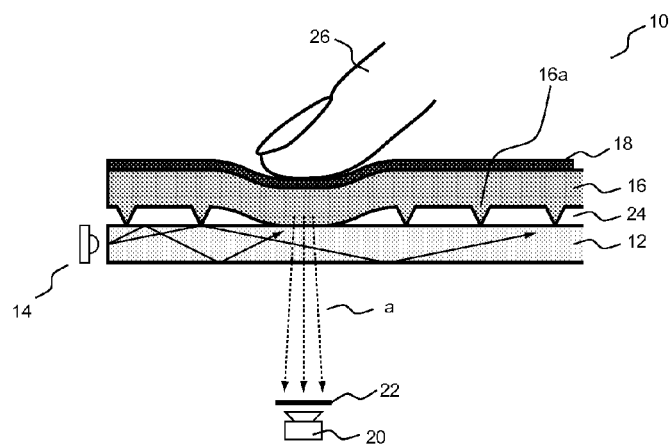
FIG. 2 is a simplified schematic illustration of an FTIR touch sensor incorporating a non-diffusive, micro-structured index-matched compliant layer in accordance with the present invention.

FIG. 2 of the drawings is a simplified schematic illustration of a multi-touch sensing system 10 in accordance with a first embodiment of the present invention. As shown, multi-touch sensing system 10 (or, for convenience, "sensor 10" or "system 10") includes an optical waveguide 12, a light source 14, a compliant layer 16, and an image sensor 20 (also sometimes referred to as an "imaging sensor" or "imaging camera"), along with other components to be described.

Light source 14 preferably is an infrared (IR) emitter, such as an IR emitter comprised of multiple high-power infrared LEDs. Light source 14 is placed directly against a polished edge of optical waveguide 12 so as to maximize coupling into total internal reflection. For example, light source 14 may provide an optical output of 460 mW at 880 nm, although other optical outputs can be employed.

Optical waveguide 12 may be a sheet of acrylic whose edges have been polished clear, but other suitable materials may be utilized. In one example of a manufactured prototype, a one-quarter inch (6.4 mm) thick acrylic sheet having the dimensions of 16 inches by 12 inches (406 mm.times.305 mm) is utilized as the optical waveguide. Common glass generally is not preferred due to its poor optical transmittance. However, clearer glass formulations (e.g. "water white", BK-7 borosilicate glass, etc.) may be employed. Though more expensive, such glass is structurally stiffer and is far less easily scratched than acrylic.

The light emitted from light source 14 undergoes total internal reflection within optical waveguide 12, thus causing the light to remain trapped within optical waveguide 12. When an object is placed in contact with optical waveguide 12, total internal reflection is frustrated thus causing some light to scatter ("scattered light") and to escape from optical waveguide 12, as represented by the arrows "a" in FIG. 2. In the absence of compliant layer 16, a finger may directly contact optical waveguide 12 to cause some light to scatter, such as described in U.S. Patent Publication No. 2008/0029691 ('691 publication, published on Feb. 7, 2008, which is incorporated herein by reference. The '691 publication, as well the inventions disclosed and claimed therein, is assigned to the assignee of the present application.

In accordance with the embodiment shown in FIG. 2, multi-touch sensing system 10 includes compliant layer 16 disposed on one side of waveguide 12. A small airgap 24 is maintained precisely between the two components due to the microstructure of the compliant layer. Compliant layer 16 may be custom molded or etched onto a layer of compliant plastic or other material or made in any other suitable manner. Compliant layer 16 or the material at its surface that is adjacent to waveguide 12 has an index of refraction sufficiently similar ("substantially similar") to the index of refraction of waveguide 12 to maximize coupling when pressure is applied (e.g., by finger 26 shown in FIG. 2) to compliant layer 16. Minute areas 16a of compliant layer 16 are in contact with waveguide 12 to maintain airgap 24. Preferably, areas 16a are small enough and sparse enough so as to not swamp the desired signal (i.e., minimize the amount of scattered light during a static, non-depressed state of compliant layer 16). Preferably, the compliant layer is chosen or engineered with a pattern such that the amount of FTIR response is dependent on the amount of force or pressure acting on it. A wavelength-selective filter film layer 18 (also called "IR filter" herein) preferably is disposed on compliant layer 16, as shown in FIG. 2, to remove or, at least, minimize effects of background illumination. In particular, IR filter 18 filters at least frequencies of light emitted by light source 14.

The stack shown in FIG. 2, comprising compliant layer 16 and waveguide 12 along with IR filter 18, is substantially transparent to visible light and, thus, is ideal for utilization with a direct view display (e.g. LCD), but also may be used with rear projection by treating the outer surface of the compliant layer to be diffusive or by adding an appropriate diffuser, such as discussed in certain embodiments described below.

In the embodiment of FIG. 2, an infrared image sensor 20 having a suitable lens, such as a wide-angle or shift lens, is mounted orthogonally relative to the waveguide and detects the light scattered through the waveguide. Preferably, the imaging sensor is equipped with a band-pass filter 22 that is matched to the output of light source 14, to minimize optical noise. Image sensor 20 may be of different types, e.g., CCD, CMOS.

Figure 2A:
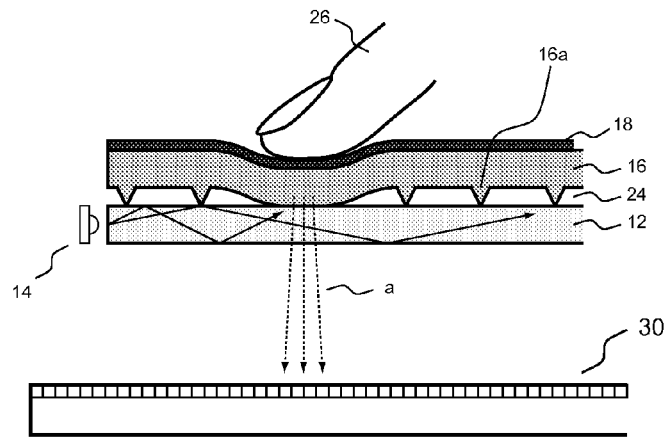
FIG. 2A is a simplified schematic illustration of an FTIR touch sensor employing a flat image sensor.
Figure 2B:
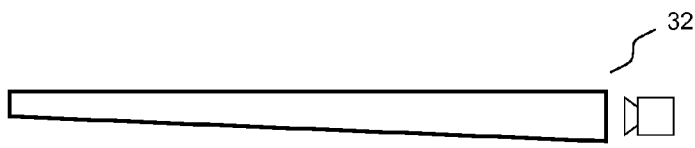
FIG. 2B is a schematic illustration of a wedge camera that may employed within the present invention.

The scattered light also may be sensed by a thin or flat image sensor 30, such as schematically shown in FIG. 2A. A wedge-optic camera, such as the camera described in the publication Boucal, et al. 2006, "Wedge Displays as Cameras," SID International Symposium Digest of Technical Papers, 37 (2). pp. 1999-2002 ("Boucal '06") may also be employed. Boucal '06 is incorporated herein by reference. Wedge-optic camera 32 is schematically illustrated in FIG. 2B. Still yet, a TFT (thin film transistor) photodiode/phototransistor array may be utilized. In each of the arrangements described above, as well as below, suitable additional optics may be employed to redirect the scattered light to enable one or more of the herein-described sensing devices to be disposed at another location relative to the waveguide (e.g., adjacent the IR emitter).

Figure 2C:
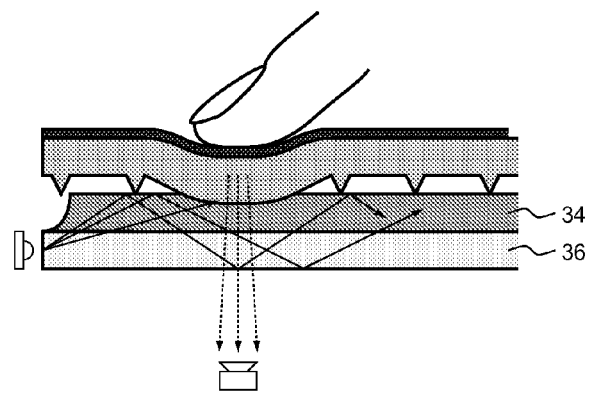
FIG. 2C is a schematic illustration of an optical waveguide that is a compound component in accordance with the present invention.

FIG. 2C schematically illustrates an optical waveguide that is a compound component in accordance with the present invention and, as shown, is comprised of non-compliant optical waveguide layer 36 treated with a compliant optical waveguide layer 34. The two layers 34 and 36 collectively operate as the optical waveguide. Layer 34 may, in another variation, be non-compliant but have other beneficial characteristics. As will be appreciated, in certain display devices/systems described herein, employing a bonded compliant layer over the optical waveguide may assist with FTIR. Other components of each of the various embodiments, such as compliant layer 16 (FIG. 2), may also be compound components.

The output of image sensor 20 (or sensor 30 or wedge camera 32 or other sensor type) may be supplied to a suitable computer (not shown) or other electronic device capable of handling various well-known image processing operations, such as rectification, background subtraction, noise removal, and analysis for each video frame. Well known vision tracking techniques then may be employed to translate the video sequences into discrete touch events and strokes. An image camera that captures the light at 8-bit monochrome at 60 frames per second at a resolution of 640×480 (corresponding to greater than 1 mm$^2$ precision) is suitable for many multi-touch sense applications. Of course, an imaging camera having greater resolution, a different frame capture rate and/or other characteristics may be employed. Processing may be carried out by any suitable computing system.

Multi-touch sensing in accordance with the present invention provides full imaging touch information without occlusion or ambiguity issues. The touch sense is zero-force and true, that is, it accurately discriminates touch from a very slight hover. The multi-touch sensing system of the invention is capable of sampling at both high temporal and spatial resolutions. The multi-touch sensing system is scalable to relatively large surfaces, such as a wall-sized touch display, although various factors including camera resolution and amount of illumination should be taken into account for the multi-touch sensing system to cover relatively large areas.

Cladded and Index-Matched Compliant Layer (Compliant Layer Design Type 2)

Figure 3:
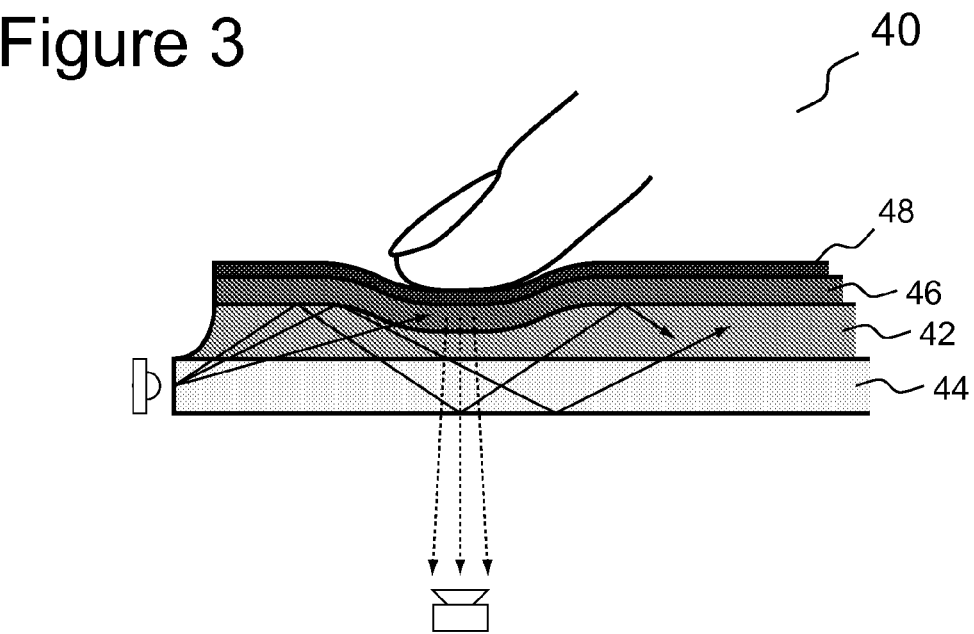
FIG. 3 is a schematic illustration of an FTIR touch sensor incorporating a cladded and index-matched compliant layer in accordance with another embodiment of the present invention.

FIG. 3 shows a simplified schematic illustration of a multi-touch sensing system 40 in accordance with another embodiment of the present invention. A clear compliant material (e.g. optical adhesive) is provided as compliant layer 42, which is index-matched and directly applied to waveguide 44. A cladding layer 46 of a lower index of refraction is disposed on compliant layer 42 at the interaction surface. The deformation of the cladding layer causes light to reflect and scatter out from the stack. As in the embodiment shown in FIG. 2, different types of sensors, such as a flat image sensor or a wedge camera, may be employed.

Cladded High Index-of-Refraction Compliant Waveguide Directly Placed on Supporting Substrate (Compliant Layer Design Type 3)

Figure 4:
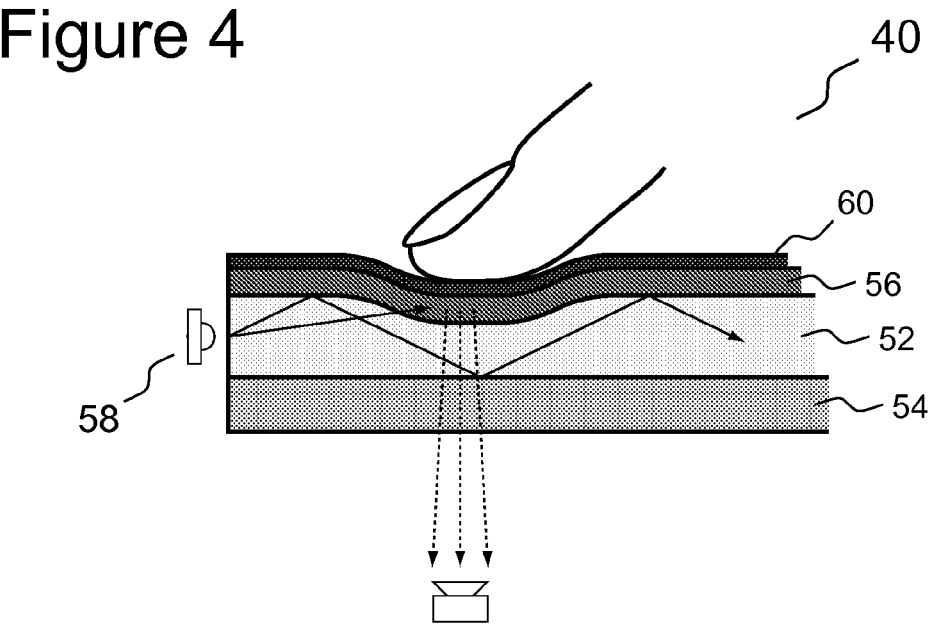
FIG. 4 is a schematic illustration of an FTIR touch sensor incorporating a cladded high index-of-refraction compliant waveguide directly placed on a supporting substrate in accordance with a further embodiment of the present invention.

FIG. 4 shows a simplified schematic illustration of a multi-touch sensing system 40 in accordance with a further embodiment of the present invention. In this embodiment, a compliant waveguide 52 operates as both the waveguide and the compliant layer. Compliant waveguide 52 is supported by a substrate 54 and is made of a clear material with refractive index higher than the substrate. A cladding layer 56 disposed at the interaction surface of compliant waveguide 52 has a lower index of refraction (e.g., PET) than the waveguide. When cladding layer 56 is deformed, such as shown in FIG. 4, light is reflected and scattered out from the stack.

Advantageously, in the embodiment shown in FIG. 4, substrate 54 does not need to operate as a waveguide for the light emitted by the light source (IR emitter 58) and, thus, substrate 54 may be made of a wide variety of materials and have a wide variety of optical characteristics. In accordance with a feature of the present invention, substrate 54 may be part of an already existing display assembly, such as an LCD display or a storefront window in a retail environment. In such case, compliant waveguide 52 and cladding layer 56 (and, optionally, an IR filter 60) may be applied in-situ to the already existing substrate 54.

As described above, FIGS. 2, 3 and 4 schematically illustrate different embodiments/variations of multi-touch sensing systems in accordance with the present invention. For convenience, the embodiment shown in FIG. 2 is referred to hereinafter as Compliant Layer Design Type 1, the embodiment shown in FIG. 3 is referred to hereinafter as Compliant Layer Design Type 2, and the embodiment shown in FIG. 4 is referred to hereinafter as Compliant Layer Design Type 3. Moreover, for each of such embodiments, different types of sensing systems/processes may be employed. In particular, FIGS. 2, 2A and 2B schematically illustrate three different types of image sensors: (1) image sensor 20 employing an appropriate lens; (2) a flat image sensor 30; and (3) a wedge-optic camera 32. Other types of sensing systems/processes may be employed, including a TFT photodiode array or other types of suitable flat image sensor not identified herein.

Each of the embodiments, including Compliant Layer Design Type 1, Type 2 and Type 3, as described above, employ various components including at least an optical waveguide. As mentioned herein, one or more of such components may be a compound component, and in particular variations, the compliant optical waveguide may be a (non-compliant) optical waveguide treated with a compliant layer collectively functioning as the optical waveguide. As is appreciated, an optical waveguide having such a compliant layer assists in FTIR.

The following described embodiments pertain to multi-touch systems that include or that are incorporated within different types of display devices/systems. Unless otherwise indicated, each of such described embodiments may be used in connection with any one of the herein-described compliant layer design types (i.e., Types 1, 2 or 3). Still further, and unless otherwise indicated, each of such described embodiments may use any type of sensing system/method (e.g., image sensor 20, flat image sensor 30, wedge-optic camera 32, etc.). Still further, and unless otherwise indicated, each of such described embodiments may use any other type of display method, if suitable, or none at all. For convenience only, FIGS. 5-6 and 8-13, described below, schematically show various embodiments employing compliant layer design type 1.

Multi-Touch Rear Projection System

Figure 5:
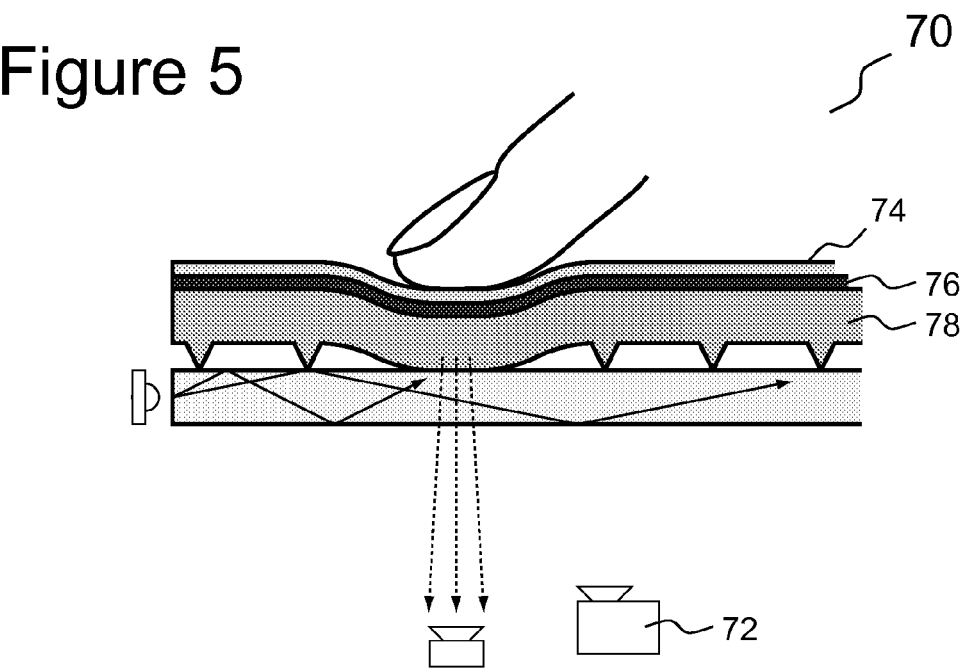
FIG. 5 shows a schematic illustration of a multi-touch rear projection system in accordance with the present invention.

FIG. 5 shows a simplified schematic illustration of a multi-touch rear projection system 70 in accordance with the present invention. A projector 72 is disposed behind the viewing/contact side of the stack (i.e., the compliant layer, waveguide, etc.) and a diffuser film 74 is disposed on the IR filter 76 (or disposed on compliant layer 78 or on cladding 46 or 56—FIGS. 3 and 4). Alternatively, diffuser film 74 is omitted and the compliant layer 78 (or compliant waveguide) is engineered to produce desired diffusing characteristics. Employing a rear projection within a multi-touch sensing system is further described in the '691 publication. Due to the use of a rear projector, it is preferable to not employ a TFT image sensor unless such sensor is designed to not interfere with the video projection. This embodiment, as well as various other embodiments, advantageously has zero disparity between the display and the interaction surface.

Multi-Touch Front Projection System

Figure 6:
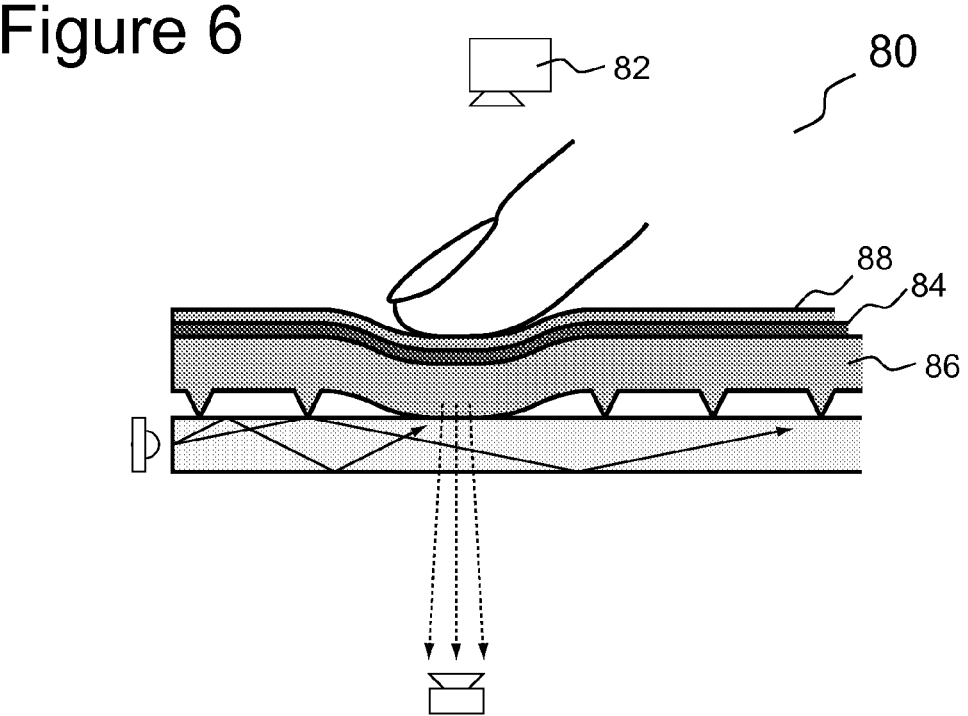
FIG. 6 shows a schematic illustration of a multi-touch front projection system in accordance with the present invention.

Front-projection is still useful in many environments where space is an issue. FIG. 6 is a schematic illustration of a multi-touch front projection system 80 in accordance with the present invention. System 80 includes, along with the previously described components of the multi-touch sensor (i.e., waveguide, compliant layer), a front projector 82, an infrared-opaque film (barrier 84) that is disposed on the compliant layer 86, and any suitable front-projection layer (projection screen 88) disposed over barrier 84. Since the stack does not need to be visibly transparent due to front projection, an infrared-opaque film is preferred and substantially more effective than an IR filter (e.g., IR filter 76 shown in FIG. 5). As previously mentioned, different types of image sensors may be employed.

Multi-Touch Systems Incorporating Active Matrix Liquid Crystal Displays

Figure 7A:
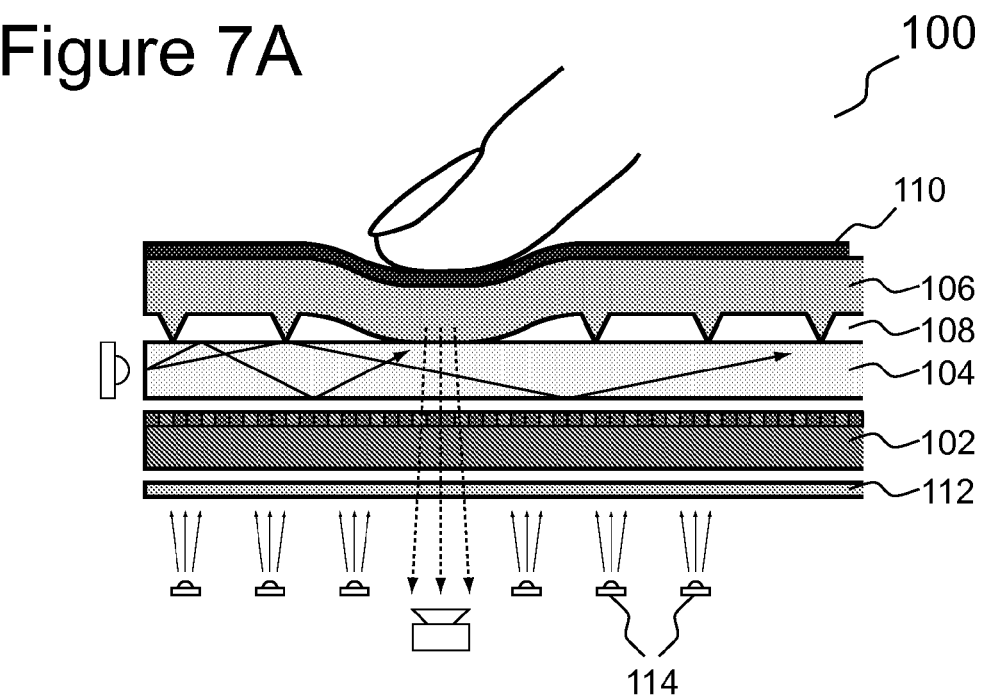
FIGS. 7A and 7B are schematic illustrations of multi-touch systems that employ different compliant layer designs and include an active matrix LCD (AMLCD) in accordance with the present invention.
Figure 7B:
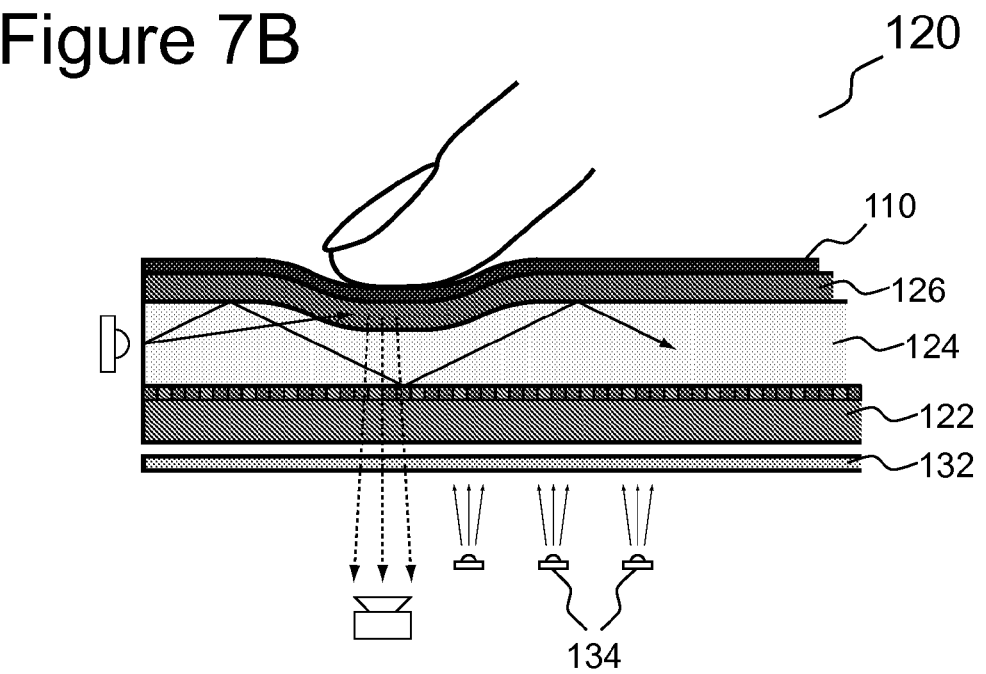

FIGS. 7A and 7B are schematic illustrations of multi-touch systems that employ compliant layer design types 1 and 3, respectively, and include active matrix LCDs (AMLCD) in accordance with the present invention. Referring first to FIG. 7A, multi-touch system 100 employs an active LCD panel 102 disposed behind a waveguide 104. In the embodiment of FIG. 7A, compliant layer design type 1 is employed, which includes a compliant layer 104, along with an airgap 108 disposed between waveguide 104 and compliant layer 106, and an IR filter 110. A diffuser 112 is disposed adjacent to, preferably contacting, the backside of LCD panel 102, and multiple emissive sources (backlights 114), such as LEDs, are distributed evenly behind diffuser 112. Different types of image sensors may be employed.

In the embodiment shown in FIG. 7B, multi-touch system 120 employs an active LCD panel 122 disposed behind a compliant layer design type 3, in which a cladding layer 126 is disposed on a compliant waveguide 124. As in the embodiment of FIG. 7A, a diffuser 132 is disposed adjacent to the backside of LCD panel 122 and multiple emissive sources (backlights 134) are distributed evenly behind diffuser 132.

In accordance with the present invention, the embodiments shown in FIGS. 7A and 7B may be applied to typical, existing, off-the-shelf type, generally non-flexible, LCDs. Such LCDs typically are transparent to infrared wavelengths and, thus, the imaging sensor of the present invention is suitably disposed behind the active LCD layer without modification to the LCD layer. In broader terms, the LCD may be suitably disposed within the optical path (of the infrared light) between the optical waveguide and the image sensor. If necessary, the existing backlight unit (BLU) of the LCD is modified to include the above-mentioned diffuser (e.g., diffuser 112, 134) against the backside of the LCD panel and suitable emissive sources are disposed behind the diffuser.

Figure 7C:
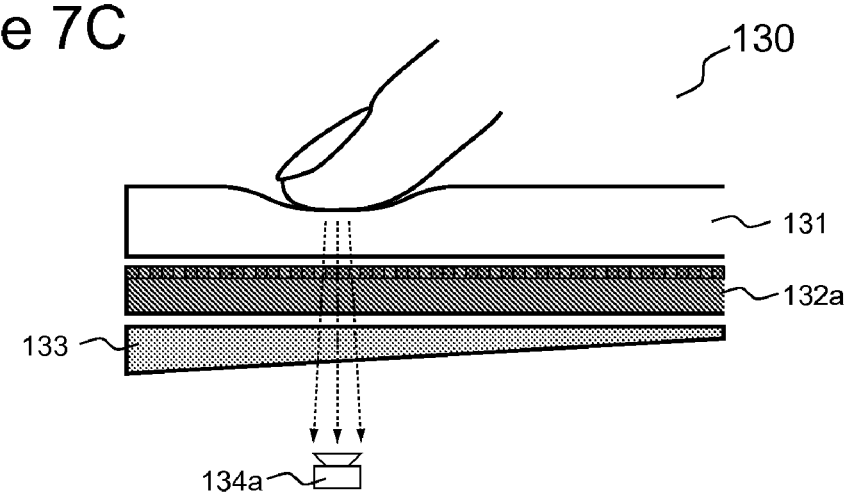
FIGS. 7C, 7D and 7E are schematic illustrations that show additional multi-touch systems employing an LCD display.
Figure 7D:
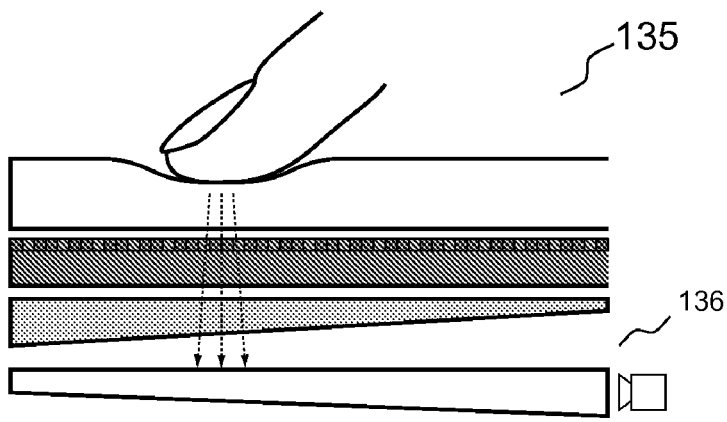
Figure 7E:
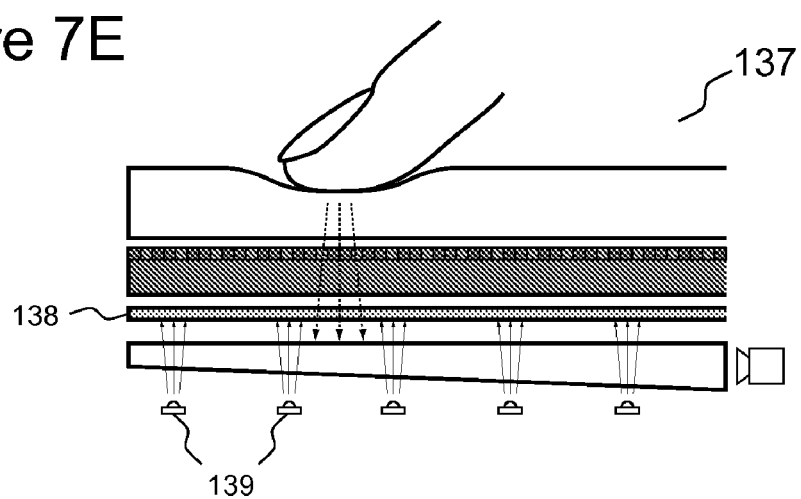

FIGS. 7C, 7D and 7E show additional, exemplary combinations of the present invention employing an LCD display. FIG. 7C is a schematic illustration of a system 130 that includes an FTIR sensing stack 131 (using any of the described embodiments) that is deposed on an LCD 132a along with a thin-profile wedge backlight unit 133. Image sensing is achieved with a direct view video camera 134a.

FIG. 7D is a schematic illustration of a system 135 that is a similar to system 130 shown in FIG. 7C, but employs a wedge-optic camera 136 for image sensing. FIG. 7E shows another system 137 similar to system 130, but instead of utilizing a wedge backlight unit, the LCD is direct backlit using a diffuser 138 and light sources 139.

Multi-Touch System Incorporating Optical Sensing AMLCD/AMOLED

FIG. 8 schematically illustrates a multi-touch system 140 that utilizes an active-matrix LCD 142 that includes within the LCD panel additional optical sensing elements (called herein, for convenience, "LCD/optical sensing panel"). LCD panels that include, essentially, a flat camera onto the panel itself, are known. The sensors within the LCD panels ordinarily are used to sense touch visually, typically through shadows. See, for example, "Active Matrix LCD with Integrated Optical Touch Screen" Willem den Boer, Adi Abileah, Pat Green, Terrance Larsson, Scott Robinson, and Tin Nguyen, SID Symposium Digest 34, 1494 (2003), which is incorporated herein by reference.

The multi-touch system 140 of the present invention shown in FIG. 8, however, does not utilize the sensors to sense touch directly, that is, through shadows or other direct imaging, but instead integrates the herein-described FTIR techniques with the LCD display so that the sensors within the LCD display are used to sense the light that escapes the optical waveguide. A non-diffusive compliant layer 144 is stacked on an IR-pumped waveguide 146, which is disposed on the LCD panel 142. The LCD backlight unit (BLU) 148 is disposed behind the LCD panel 142 without the inclusion of additional image sensors disposed behind (or in front of) the backlight unit. For a typical, off-the-shelf LCD panel with integrated photosensors, no modification to the LCD panel's backlight unit is necessary. Preferably, the sensing elements on the LCD are individually equipped with IR filters (as part of the LCD color filter array).

In a variation of the embodiment shown in FIG. 8, an active matrix OLED with integrated sensors may be employed in place of the LCD panel shown in FIG. 8.

Multi-Touch System with Flexible Display

FIG. 9 schematically illustrates a multi-touch system 160 that employs a flexible OLED 162 (also known as "FOLED"). Flexible OLEDs generally are fabricated on plastic substrates that can deform substantially under force. Flexible OLEDs are well known, such as discussed in G. Gustafsson, Y. Cao, G. M. Treacy, F. Klavetter, N. Colaneri, A. J. Heeger, Flexible light-emitting diodes made from soluble conducting polymers, Nature 1992, 357, 477, which is incorporated herein by reference. In accordance with the embodiment shown in FIG. 9, FOLED 162 is disposed directly on the compliant layer 164. Upon contact, the force is transmitted through the flexible display (i.e., FOLED 162) to the compliant layer 164. Usually, the display is opaque to IR so no IR-filter is necessary. If not, an opaque barrier optionally may be disposed behind the display. Similar to various other embodiments, an image sensor 168 is disposed behind the waveguide 166 to detect the scattered light. FOLED 162 preferably is sufficiently compliant to deform under desired touch sensitivity. The embodiment of FIG. 9 advantageously has zero disparity between the display and the interaction surface.

In accordance with the present invention, various other flexible-type displays may be used in place of a flexible OLED. For example, so-called "eInk" displays, which are discussed in Huitema, H. E. A.; Gelinck, G. H.; van der Putten, J. B. P. H.; Kuijk, K. E.; Hart, C. M.; Cantatore, E.; Herwig, P. T.; van Breemen, A. J. J. M.; de Leeuw, D. M. "Plastic transistors in active-matrix displays" Nature 2001, 414, (6864), 599 and which is incorporated herein by reference, may be utilized. Other flexible emissive or reflective displays (e.g., electrophoretic, electrochromic) may be utilized.

Multi-Touch System with "Double-Sided Flexible OLED"

Figure 10:
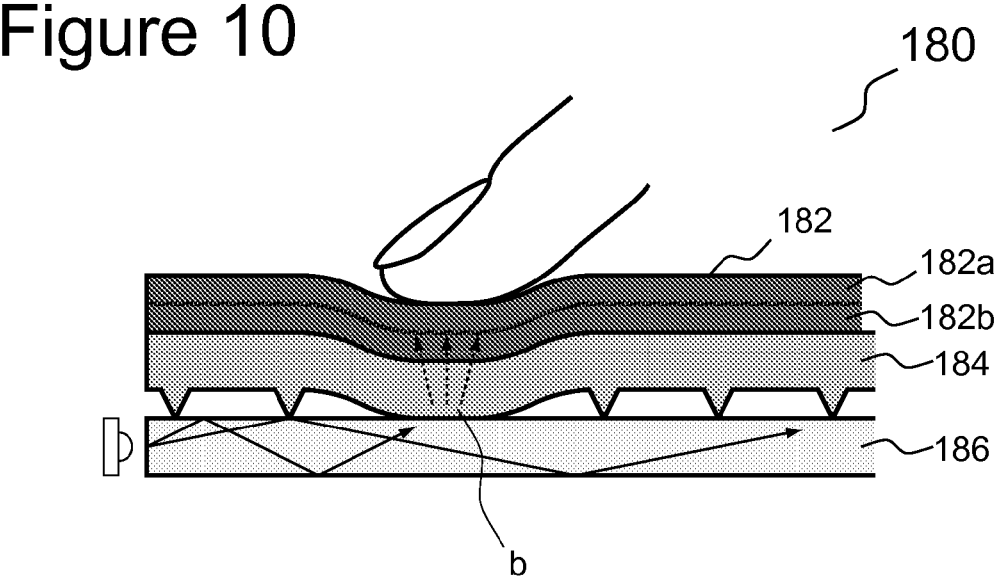
FIG. 10 schematically illustrates a multi-touch system that employs a flexible OLED in which one side functions as an emissive display, while the other side functions as an image sensor.

FIG. 10 schematically illustrates a multi-touch system 180 that employs two flexible layers integrated onto the same substrate, or laminated back to back, where both layers are active. In particular, one layer may be an emissive FOLED (emissive layer) and the other layer may be a flexible TFT photodiode array (sensing layer). The two flexible layers combined back to back are called herein, for convenience, a double-sided FOLED and is shown as element 182 in FIG. 10. FOLEDs have been commonly fabricated with per-pixel integrated sensing elements, usually to track aging of the emissive component, and such elements are usually stacked beneath the pixel. These sensing elements are typically shielding from optical signals below the substrate.

In the embodiment shown in FIG. 10, double-sided FOLED 182 has a display side 182a and an optical sensing array 182b fabricated on its opposite side so that it can sense optical signals incident on that side. Double-sided FOLED 182 is disposed onto a compliant surface 184, which is disposed on top of an IR-pumped waveguide 186.

When compliant layer 184 contacts waveguide 186, due to some force exerted on double-sided FOLED 182, the scattered light (represented by arrows "b" in FIG. 10) escapes through compliant layer 184 and is received at the optical sensing side 182b and thus sensed by double-sided FOLED 182. No additional image sensor is needed in the embodiment of FIG. 10. Further, no IR-filter is necessary.

Multi-Touch System with Flexible LCD

Figure 11:
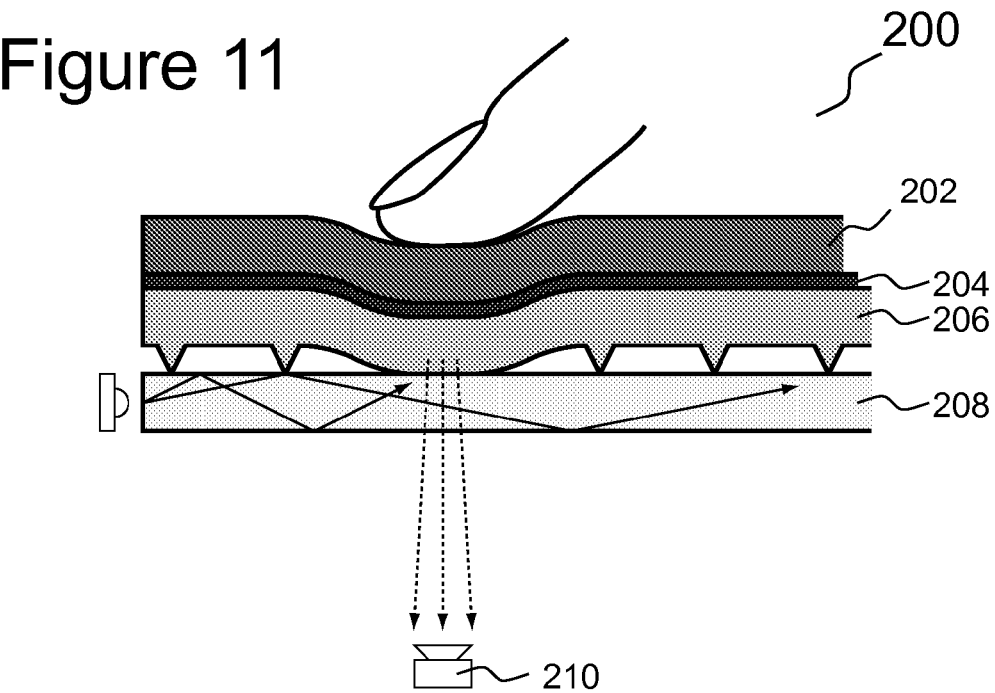
FIG. 11 schematically illustrates a multi-touch system that employs a flexible LCD.

FIG. 11 schematically illustrates a multi-touch system 200 that employs a flexible LCD 202 that is sufficiently flexible to deform under the touch of a finger. LCDs developed on plastic substrates that are sufficiently flexible are known, such as disclosed in "Active Matrix Displays Made with Printed Polymer Thin Film Transistors," H. Sirringhaus, S. E. Burns, C. Kuhn, K. Jacobs, J. D. MacKenzie, M. Etchells, K. Chalmers, P. Devine, N. Murton, N. Stone, D. Wilson, P. Cain, T. Brown, A. C. Arais, J. Mills, R. H. Friend Plastic Logic Limited, which is incorporated herein by reference. Since LCDs, including flexible LCDs are not emissive, the embodiment of FIG. 11 includes a thin flexible backlight 204 that is disposed between flexible LCD 202 and the compliant layer 206 of the FTIR sensor of the present invention. Similar to various other embodiments, an image sensor 210 is disposed behind the waveguide 208 to detect the scattered light.

Figure 12:
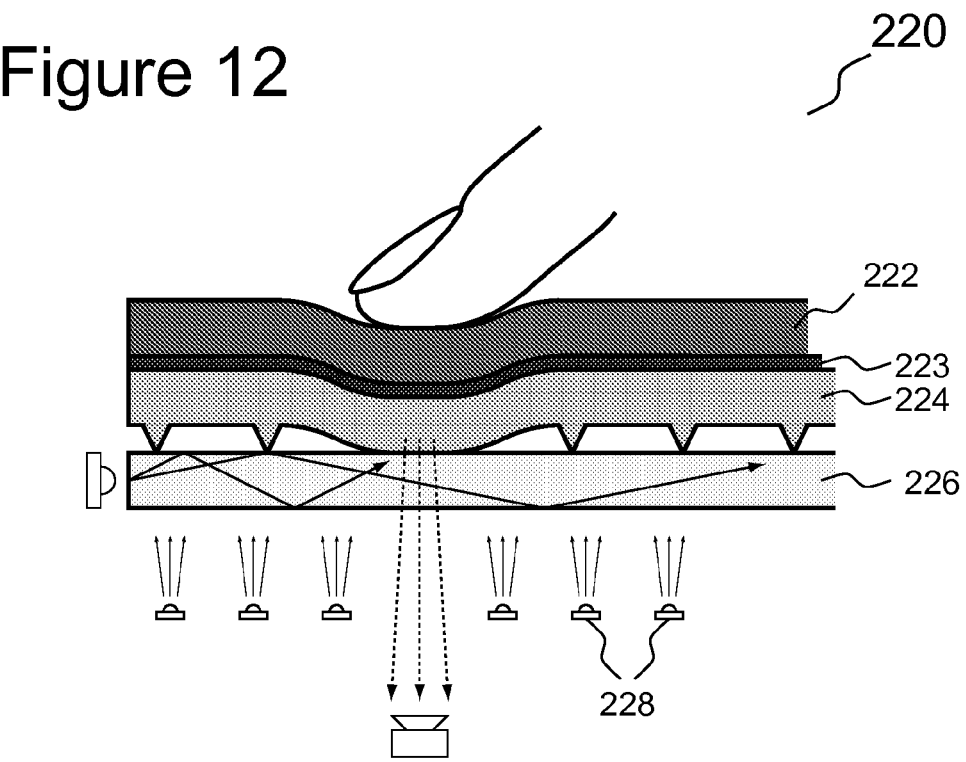
FIG. 12 schematically illustrates a multi-touch system that employs a flexible LCD and a compliant layer acting as the backlight diffuser.

Multi-Touch System with Flexible LCD and Compliant Layer Acting as Backlight Diffuser FIG. 12 is a schematic illustration of a multi-touch system 220 similar to the embodiment of FIG. 11, having a flexible LCD 222, and an IR filter 223, but the compliant layer 224 operates as both the diffusing backlight unit for the LCD and the compliant surface disposed on the IR-pumped waveguide 226. Visible light output from backlights 228 (e.g., an array of LEDs), which are disposed behind waveguide 226, is directed onto compliant layer 224, which preferably has strongly diffusive properties, which in turn operates as the backlight unit for the flexible LCD 222.

Multi-Touch System with Flexible LCD with Integrated Sensors

Figure 13:
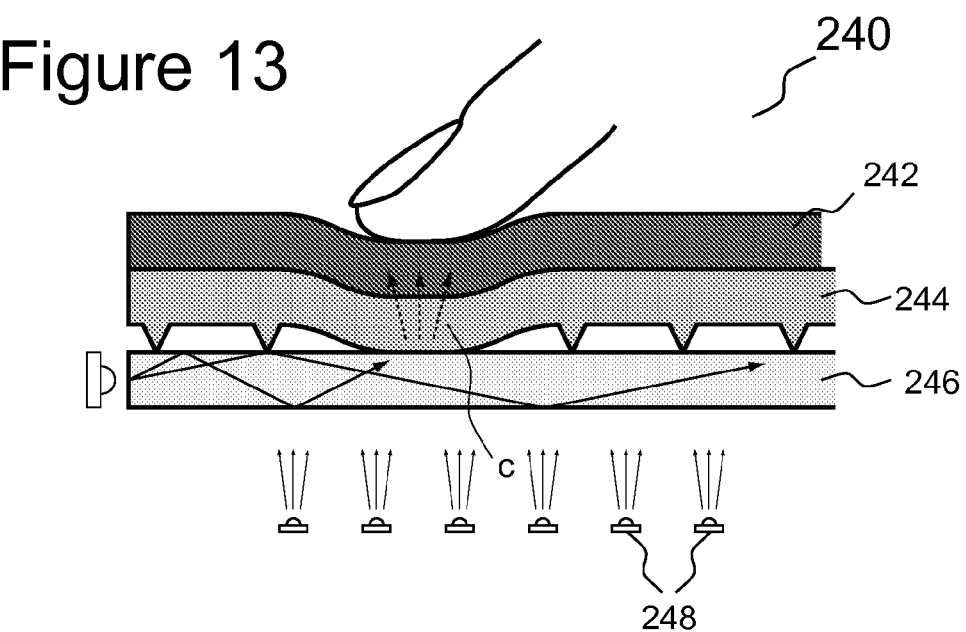
FIG. 13 schematically illustrates a multi-touch system that employs a flexible LCD containing integrated sensors.

FIG. 13 schematically illustrates a multi-touch system 240 that employs a flexible LCD 242 that contains integrated sensors.

In the embodiment shown in FIG. 13, flexible LCD 242 is disposed on compliant layer 244, which is disposed on top of the IR-pumped waveguide 246. The emissive sources (backlights 248) are distributed behind waveguide 246.

Compliant layer 244, when depressed, contacts waveguide 246 and the resulting scattered light (represented by arrows "c" in FIG. 13) escapes through compliant layer 244 and is sensed by the sensors integrated within flexible LCD 242. No additional image sensor or IR-filter is necessary in the embodiment shown in FIG. 13.

Figure 14:
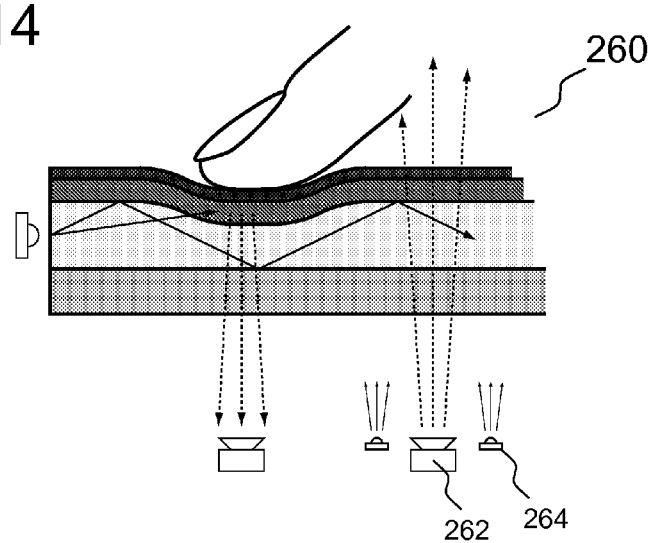
FIG. 14 is a schematic illustration of a multi-touch sensing system that employs an additional sensor for non-FTIR sensing.

Multi-Touch Sensing System with Additional Sensing Capability/Gesture and Fiducial Sensing Using a Second Image Sensor In accordance with the present invention, various embodiments described herein optionally may include an additional image sensor to observe, not the herein-described FTIR effect caused by touch, but other visual information such as hand pose, "hover" information, fiducial markers on objects or tokens, and other visually recognizable elements. FIG. 14 is a schematic illustration of a multi-touch sensing system 260 that employs such an additional sensor 262 (also called "secondary image sensor" herein). FIG. 14 further shows the multi-touch sensing system with previously described compliant layer design type 3 (described with reference to FIG. 4). However, the other herein-described compliant layer designs may be employed with a secondary image sensor used to detect other visual information. Still further, the multi-touch sensing system with additional sensing capability in accordance with the present invention may include or be incorporated within any of the display devices described herein so long as the secondary image sensor is able to image/sense the element (e.g., a finger) or elements above the system's contact surface (i.e. is not filtered by the forementioned IR filter), and preferably also does not detect the signal from the primary FTIR image sensor.

The secondary image sensor 262, such as shown in FIG. 14, preferably is equipped with a bandpass filter of a different wavelength than that used for the FTIR system. Additional illuminants 264, matched to the wavelength of the secondary image sensor's bandpass filter, aid the parallel sensing system to, among other things, sense fingers or objects hovering when touch is not being sensed by the primary sensor. Various applications of the secondary image sensor include determining identity (e.g., of each finger of a hand . . . thumb, index finger, etc.) of each touch region, recognizing position/orientation/gesture of the hand or of other objects, and identifying/recognizing other visual elements and/or movements.

Multi-Touch Sensing System Incorporating an Auto-Calibration System

In various embodiments described herein, the (primary) image sensor (e.g., image sensor 22 shown in FIG. 2) may be equipped with a band-pass filter (e.g., filter 22) that is matched to the output of the IR emitter (e.g., light source 14). In accordance with the present invention, such various embodiments may include an auto-calibration system, such as schematically shown as system 280 in FIG. 15. As shown, the band-pass filter (switchable bandwidth filter 282) is mounted on a mechanical filter holder that is operable under computer control to be moved in or out of (represented by arrows "d") the optical path. Generally, the filter is used to prevent the camera (image sensor 284) from seeing the graphical image output from, for example, projector 288, and displayed on display 290. When filter 282 is moved out of the optical path, image sensor 284 (along with appropriate signal processing of the output of image sensor 284) is operable in accordance with the present invention to register the infrared touch image coordinate system precisely to the graphical coordinate system. Registration of the graphical coordinate system to the infrared image is performed as follows. The filter is moved out of the optical path, the computer is instructed to send a point (i.e. fiducial) to be graphically output on the display. This point is sensed by the image sensor, and its coordinate noted. The process is repeated for multiple other points on the screen surface (e.g. the 4 corners of the screen), and used to construct a geometric mapping between the graphical coordinate system and the image sensor coordinate system. This may be done exhaustively for every point on the screen, or may be done more efficiently by fitting mathematical models to a sparser set of correspondences. Once this mapping is computed, all touch sensor data from the image sensor is rectified to the graphical coordinate system.

Figure 15:
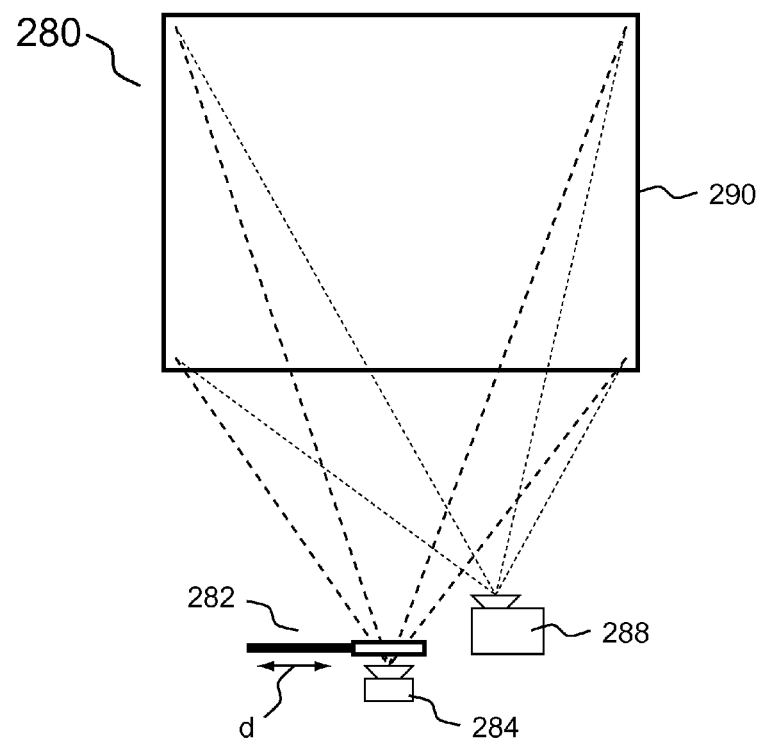
FIG. 15 is a schematic illustration of a multi-touch sensing system incorporating an auto-calibration system in accordance with the present invention.

As another feature of the auto-calibration system shown in FIG. 15, image sensor 284 may further be utilized to geometrically align multiple overlapping image projections, such as when larger systems incorporating multiple projectors are used.

Additional Variations and Features

In various embodiments described herein, the IR emitter may be pulsed and synchronized to the shutter of the image sensor to beneficially reduce the amount of ambient light received by the image sensor. If desired, the light source can be pulsed at a brighter intensity to increase the signal to noise ratio of the system.

In various embodiment described herein, the "IR" emitter may be chosen to be of near-UV wavelength. In such variations, components previously suited for IR are replaced with components for this alternate band, especially since UV can be quite degrading. For UV, special additional consideration must be taken into account to protect users from stray emissions, due to the harmfulness of UV. Advantageously, the filters associated with compliant layers described in various embodiments herein, used to shield the sensor from background signal, may also be utilized to shield the user from UV light scattered from the optical waveguide.

In addition, multiple image sensors may be employed to sense the FTIR effect caused by touch, generally to allow for the implementation of a relatively large multi-touch system. The image sensors may be spaced apart from one another along a single axis, multiple axes, along a grid system, or other suitable manner.

In another variation, two or more wavelengths of light, preferably infrared light, are output from the light source and multiple image sensors are employed for detecting the different wavelengths. For example, two sets of LEDs are employed to pump the waveguide, one at, for example, 880 nm, and the other at, for example, 950 nm. Then, each image sensor images a different wavelength. Different wavelength filters may be employed for this purpose. As a useful optional feature, light must be received (at a particular time and location) by both image sensors for the system to deem the occurrence of a depression (i.e., FTIR response) at such time/location. Well known processing methods may be employed to process both video streams in this matter. Thus, by employing multiple wavelengths and multiple image sensors, FTIR response is further discriminated from background light. Moreover, a live finger can be discriminated from latent residues in the event a compliant surface is not utilized by recognizing the ratios of intensities for each wavelength that is specific to a human finger. Three or more wavelengths may be employed.

In certain embodiments, the compliant layer may be made of various plastic films and other materials. The compliant layer may be comprised of a composite of multiple materials, each generally contributing to one or more of the following desired characteristics: i) optical FTIR performance; ii) infrared shielding to mitigate interference from external ambient light; iii) anti-glare to increase visibility of the display; iv) the tactile "feel" for the human user (including but not limited to aspects such as friction); and v) durability—a hardcoat layer preferably replaceable in the field. The various layers employed may be affixed to one another using well-known index-of-refraction matched optical adhesives. As one example of a compliant surface comprised of a composite of multiple materials, a stack includes (1) a thin layer of rubber, (2) a thin-film PET (polyethylene terephthalate) film with metal coating, and (3) a thin PET film treated to have a matte surface. The thin layer of rubber provides for FTIR, along with tactile response and feel. The thin-film PET film with metal coating reflects/absorbs ambient infrared light. The thin PET film treated to have a matte surface provides for a comfortable surface on which a user's finger or fingers can easily glide across, and for wearability.

In yet another variation of certain embodiments described herein, the contact surface is not flat, i.e., non-planar. For example, the contact surface may be concave, convex or other non-flat design. The contact surface may be spherically shaped.

The present invention has been described in the context of a number of embodiments and variations thereof. It is to be understood, however, that other expedients known to those skilled in the art may be employed without departing from the spirit of the invention.

What is claimed is:

1. A multi-touch sensing system, comprising:
an optical waveguide having first and second sides;
a compliant layer directly coupled to the first side of the optical waveguide, the compliant layer and the optical waveguide having substantially similar indexes of refraction so that light of at least one wavelength received by the optical waveguide in a predetermined direction undergoes total internal reflection within the optical waveguide and the compliant layer;
a cladding layer directly coupled to the compliant layer and having an index of refraction sufficiently lower than the index of refraction of the compliant layer so that deformation of the cladding layer causes some of the light undergoing total internal reflection to scatter and to escape the compliant layer and the optical waveguide; and
an image sensor adapted to detect at least some of the light that escapes the compliant layer and the optical waveguide.

2. The multi-touch sensing system of claim 1, wherein the cladding layer has an associated light filter for filtering light of said at least one wavelength.

3. The multi-touch sensing system of claim 1, wherein the cladding layer is deformable by depressing a surface of the cladding layer by a finger of a user of the multi-touch sensing system.

4. The multi-touch sensing system of claim 1, wherein the image sensor is optically disposed to receive the light that escapes from the second side of the optical waveguide.

5. The multi-touch sensing system of claim 4, further comprising a band pass filter optically disposed between the second side of the optical waveguide and the image sensor for allowing substantially only the light of said at least one wavelength to pass from the optical waveguide to the image sensor.

6. The multi-touch sensing system of claim 1, further comprising a light source disposed directly against an edge of the optical waveguide for emitting light of said at least one wavelength and received by the optical waveguide in at least said predetermined direction.

7. The multi-touch sensing system of claim 1, wherein the optical waveguide is a compound component comprised of a non-compliant optical waveguide layer and a compliant optical waveguide layer disposed on the non-compliant optical waveguide layer, the compliant optical waveguide layer being disposed on the first side of the optical waveguide so that the compliant layer is coupled to the compliant optical waveguide layer of the optical waveguide.

8. The multi-touch sensing system of claim 1, further comprising a rear projector for projecting a video image towards the second side of the optical waveguide, and wherein the cladding layer, compliant layer and the optical waveguide are substantially transparent to visible light so that the displayed video image is viewable through the cladding layer, compliant layer and the optical waveguide.

9. The multi-touch sensing system of claim 8, further comprising a diffuser disposed on the cladding layer for diffusing the video image projected towards the second side of the optical waveguide.

10. The multi-touch sensing system of claim 8, wherein the compliant layer is adapted to diffuse the video image projected towards the second side of the optical waveguide.

11. A multi-touch sensing system, comprising:
a compliant optical waveguide having an index of refraction sufficient to cause light of at least one wavelength received in a predetermined direction to undergo total internal reflection within the compliant optical waveguide, the compliant optical waveguide having first and second sides;
a cladding layer directly coupled to the first side of the compliant optical waveguide and having an index of refraction sufficiently lower than the index of refraction of the compliant optical waveguide so that deformation of the cladding layer causes some of the light undergoing total internal reflection to scatter and to escape the compliant optical waveguide; and
an image sensor adapted to detect at least some of the light that escapes the compliant optical waveguide.

12. The multi-touch sensing system of claim 11, wherein the cladding layer has an associated light filter for filtering light of said at least one wavelength.

13. The multi-touch sensing system of claim 11, wherein the cladding layer is deformable by depressing a surface of the cladding layer by a finger of a user of the multi-touch sensing system.

14. The multi-touch sensing system of claim 11, wherein the image sensor is optically disposed to receive the light that escapes from the second side of the compliant optical waveguide.

15. The multi-touch sensing system of claim 14, further comprising a band pass filter optically disposed between the second side of the compliant optical waveguide and the image sensor for allowing substantially only the light of said at least one wavelength to pass from the compliant optical waveguide to the image sensor.

16. The multi-touch sensing system of claim 11, further comprising a light source disposed directly against an edge of the compliant optical waveguide for emitting light of said at least one wavelength and received by the compliant optical waveguide in at least said predetermined direction.

17. The multi-touch sensing system of claim 11, wherein the compliant optical waveguide is a compound component comprised of a non-compliant optical waveguide layer and a compliant optical waveguide layer disposed on the non-compliant optical waveguide layer, the compliant optical waveguide layer being disposed on the second side of the compliant optical waveguide so that the cladding layer is coupled to the compliant optical waveguide layer.

18. The multi-touch sensing system of claim 11, further comprising a rear projector for projecting a video image towards the second side of the compliant optical waveguide, and wherein the cladding layer and the compliant optical waveguide are substantially transparent to visible light so that the displayed video image is viewable through the cladding layer and the compliant optical waveguide.

19. The multi-touch sensing system of claim 18, further comprising a diffuser disposed on the cladding layer for diffusing the video image projected towards the second side of the compliant optical waveguide.

20. The multi-touch sensing system of claim 18, wherein the compliant optical waveguide is adapted to diffuse the video image projected towards the second side of the compliant optical waveguide.

* * * * *